US012335210B2

(12) United States Patent
Reil et al.

(10) Patent No.: US 12,335,210 B2
(45) Date of Patent: *Jun. 17, 2025

(54) SYSTEMS AND METHODS FOR INTELLIGENT DELIVERY OF COMMUNICATIONS

(71) Applicant: Open Text Holdings, Inc., Menlo Park, CA (US)

(72) Inventors: Dennis Reil, Großheide (DE); Frank Steffen, Hamburg (DE); Martin Richter, Edewecht (DE)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/534,082

(22) Filed: Dec. 8, 2023

(65) Prior Publication Data

US 2024/0106774 A1 Mar. 28, 2024

Related U.S. Application Data

(63) Continuation of application No. 17/677,917, filed on Feb. 22, 2022.

(51) Int. Cl.
*H04L 51/046* (2022.01)
*G06Q 10/0631* (2023.01)
(Continued)

(52) U.S. Cl.
CPC ..... *H04L 51/046* (2013.01); *G06Q 10/06315* (2013.01); *G06Q 10/10* (2013.01);
(Continued)

(58) Field of Classification Search
CPC ... G06F 9/542; G06F 9/44521; G06F 11/3466
See application file for complete search history.

(56) References Cited

U.S. PATENT DOCUMENTS 11,398,218 B1 * 7/2022 Haslam ................ G10L 13/033
12,099,794 B2   9/2024 Lorensson
(Continued)

OTHER PUBLICATIONS

Office Action for U.S. Appl. No. 17/944,754, issued by the U.S. Patent and Trademark Office, Dec. 22, 2023, 11 pgs.
(Continued)

*Primary Examiner* — Barbara B Anyan
(74) *Attorney, Agent, or Firm* — Sprinkle IP Law Group

(57) ABSTRACT

Systems, methods and products for intelligent delivery of communications, where a machine learning engine is trained to identify an output channel for delivery of a communication based on received context information and intended recipient information and to route the communication to the selected channel. An intelligent delivery task in a communication flow model is performed by the machine learning engine, which receives customer/recipient data such as age, region, gender, etc., and context data such as communication type, time of day, working hours, etc., and uses this data to determine which of a set of different channels is likely to be most effecting for sending the communication to the recipient. A user therefore does not have to build a complex static communication flow, but simply adds an intelligent delivery task to the flow. The output channel is dynamically selected and may vary for different recipients and communications.

20 Claims, 9 Drawing Sheets

(51) Int. Cl.
  *G06Q 10/10*      (2023.01)
  *G06Q 30/0201*    (2023.01)
  *G06Q 30/0204*    (2023.01)
  *G06F 9/445*      (2018.01)
  *G06F 9/54*       (2006.01)

(52) U.S. Cl.
  CPC ..... *G06Q 30/0201* (2013.01); *G06Q 30/0205* (2013.01); *G06F 9/44521* (2013.01); *G06F 9/542* (2013.01)

(56) References Cited

U.S. PATENT DOCUMENTS

| | | | |
|---|---|---|---|
| 12,204,843 B2 | 1/2025 | Smith | |
| 12,229,490 B2 | 2/2025 | Smith | |
| 2003/0192036 A1* | 10/2003 | Karkare | G06F 11/3466 717/148 |
| 2003/0204429 A1* | 10/2003 | Botscheck | G06Q 10/10 715/738 |
| 2004/0046787 A1* | 3/2004 | Henry | G06F 8/38 715/744 |
| 2007/0201654 A1* | 8/2007 | Shenfield | G06F 9/44521 379/201.01 |
| 2007/0283364 A1* | 12/2007 | Deininger | G06F 9/542 719/318 |
| 2009/0150507 A1 | 6/2009 | Davis | |
| 2013/0275528 A1* | 10/2013 | Miner | G06Q 30/0201 709/206 |
| 2016/0070815 A1 | 3/2016 | Carlsson | |
| 2020/0014604 A1 | 1/2020 | Lorensson | |
| 2024/0037317 A1 | 2/2024 | Lorensson | |
| 2024/0039800 A1 | 2/2024 | Smith | |

OTHER PUBLICATIONS

Office Action for U.S. Appl. No. 17/677,915 issued by the United States Patent and Trademark Office, Feb. 9, 2024, 17 pgs.
Notice of Allowance for U.S. Appl. No. 18/484,490 issued by the United States Patent and Trademark Office, mailed Aug. 15, 2024, 13 pgs.
Notice of Allowance for U.S. Appl. No. 18/322,446 issued by the United States Patent and Trademark Office, mailed Aug. 30, 2024, 2 pgs.
Notice of Allowance for U.S. Appl. No. 18/484,828 issued by the United States Patent and Trademark Office, mailed Sep. 18, 2024, 5 pgs.
Office Action for U.S. Appl. No. 18/322,446 issued by the United States Patent and Trademark Office, mailed Apr. 28, 2024, 9 pgs.
Notice of Allowance for U.S. Appl. No. 18/484,490 issued by the United States Patent and Trademark Office, mailed May 13, 2024, 12 pgs.
Office Action for U.S. Appl. No. 18/484,828 issued by the United States Patent and Trademark Office, mailed Jun. 6, 2024, 19 pages.
Office Action for U.S. Appl. No. 17/677,915 issued by the U.S. Patent and Trademark Office, mailed Jul. 30, 2024, 15 pgs.
Notice of Allowance for U.S. Appl. No. 17/944,754 issued by the United States Patent and Trademark Office, mailed Sep. 17, 2024, 4 pgs.
Notice of Allowance for U.S. Appl. No. 17/677,915 issued by the United States Patent and Trademark Office, mailed Dec. 6, 2024, 5 pgs.

* cited by examiner

SYSTEMS AND METHODS FOR INTELLIGENT DELIVERY OF COMMUNICATIONS

RELATED APPLICATION(S)

This application is a continuation of, and claims a benefit of priority under 35 U.S.C. § 120 from, U.S. patent application Ser. No. 17/677,917, filed Feb. 22, 2022, issued as U.S. Pat. No. 11,888,793, entitled "SYSTEMS AND METHODS FOR INTELLIGENT DELIVERY OF COMMUNICATIONS," which is hereby incorporated herein by reference. This application relates to U.S. patent application Ser. No. 17/677,915, filed Feb. 22, 2022, entitled "SYSTEMS AND METHODS FOR INTELLIGENT DELIVERY OF COMMUNICATIONS", which is hereby incorporated herein by reference.

TECHNICAL FIELD

This invention relates generally to customer communications management (CCM). More particularly, this invention relates to communication flow modeling systems, methods, and computer program products for customer communications management and assured delivery of communications.

BACKGROUND OF THE RELATED ART

Customer communications management refers to a convergent set of Information Technology (IT) components that together provide enterprises with the ability to manage and advance the way that they communicate with their customers. CCM was used in the print industry for complex and yet personalized document generation in high volumes (e.g., individualized billing invoices for an enterprise's customers, etc.). CCM has since evolved to include a variety of digital communication channels such as email or messaging protocols such as SMS, messenger, voice, in addition to print/mail.

Today, enterprises can utilize CCM technologies to communicate with their customers over multiple communication channels, such as print/mail, email, web portals, short message service (SMS), and fax, across a wide range of media including printed documents, email, web pages, text messages, mobile applications, etc. (collectively referred to herein as "communications"). Example types of communications can include, but are not limited to, letters, invoices, purchase orders, bank statements, account statements, sales proposals, employment contracts, loan documents, product sheets, service agreements, policies, customer correspondences, transactional documents, legal documents, and so on.

CCM encompasses various IT components. These can include data extraction, transform, and load (ETL) software, data management, analysis, and location intelligence software, data composition software, print and post processing software, mailing compliance database software, printer management software, high volume production printers, envelope inserter machines, email marketing software, SMS communication software, mobile media and content distribution software, document production reporting software, portal software, etc. Aspects of an example of a document architecture that supports CCM on a single platform can be found in U.S. Patent Application Publication Nos. US 2017/0344547 A1, US 2017/0344526 A1, and US 2017/0346828 A1, which are incorporated by reference herein.

Current products allow customer communications to be modeled manually. This is done by a non-technical user that makes use of artifacts pre-defined by a technical user. These artifacts can be used without knowing all the technical details of the artifacts or the modeling tools. The non-technical user can therefore concentrate on their area of expertise—the communication (e.g., a campaign or documents) that should be delivered to a recipient. The non-technical user designs a flow model using the available pre-defined artifacts to produce, bundle and send out the documents.

Today, this non-technical user is forced to think about how to reach a recipient. This process needs to be explicitly modeled, such as by adding an email, messenger, voice, or other output channel to a flow model. Additionally, error handling must be modeled in case the intended delivery process fails. For example, if an email could not be delivered, or if the recipient of the email does not open or read the email, it may be necessary to retry several times to send the email. This may require switching to a different delivery channel for the email, which would in turn require a corresponding activity to be manually modeled by the non-technical user.

This is, with some exceptions, the same for each recipient. Exceptions only consider that someone such as the recipient itself has made a statement on how they want to be reached. Thus, outgoing communication handling must be modeled and, in case of unreachability, alternatives must also be modeled by the non-technical user. This can become very complicated and is most likely not the most effective way of reaching an individual recipient.

The present disclosure describes a solution to the problem of manually modeling outgoing communications and not being able to do this on an individual recipient basis. It describes an automated self-learning system for selecting the most effective way to bring a communication to its recipient.

SUMMARY OF THE DISCLOSURE

Embodiments disclosed herein may be designed to provide innovations and improvements in CCM. In some embodiments, this is realized by augmenting the document architecture with an automated output channel technology that uses artificial intelligence (AI). This makes sure that the recipient of a communication is always reached through the most effective communication channel (print, email, SMS, messenger, voice, Facebook, Twitter, TikTok, to name only a few) for that individual recipient. This should prevent a process owner from having to design a flow model manually for each case and each situation to send out these communications.

The augmented CCM document architecture uses an architecture for analyzing effectiveness of communication and an AI component to decide which is the best communication channel available to reach an individual customer. This is done based on configurable customer properties such as age, region, gender, to name only a few and other properties from the context like time of the day, working hours, etc. The system is self-learning as it considers all sent out communications and the effectiveness of the communication for future output channel selection. It uses data from previous communications sent out to customers, tracking the results of various delivery methods and evaluating the results to determine the delivery methods that have the most successful results. This allows the system to automatically select the most effective channel for delivering a particular communication without requiring manual selection or intervention by a user.

The system allows non-technical users to do some configuration in a simple-to-use user experience (UX) interface to configure system behavior such as setting the time to wait on a customer reaction before selecting the next best option to reach out to that customer or reinforcing communication through the best channel. The UX interface can aid the selection of an effective setting.

One embodiment comprises an intelligent delivery system that includes an intelligent delivery server machine, one or more input connectors and a plurality of output connectors. The intelligent delivery server machine is configured to execute a self-learning machine learning engine which is trained to identify one of the plurality of output connectors for delivery of a communication based on received context information and intended recipient information. The input connectors are coupled to the intelligent delivery server, and the intelligent delivery server receives the context information and intended recipient information via the input connectors. The intelligent delivery server is configured to select one of the output connectors for delivery of the communication and to route the communication to the selected output connector.

In some embodiments, the system further comprises an event collector which is coupled to the output connectors and is configured to collect event information associated with delivery of the communication by the selected one of the output connectors. The system also includes an event database coupled to the event collector and configured to store event information collected by the event collector.

The system may also have a delivery tracker which is configured to receive event information from the event database, where the delivery tracker is also configured to track delivery of the communication via the selected one of the output connectors and to provide delivery information to the machine learning engine. The machine learning engine may be configured to receive delivery information from the delivery tracker and to self-learn based on the received delivery information, thereby adapting the training of the machine learning engine to identify output connectors for delivery of communications. In some embodiments, the machine learning engine is trained to identify the one of the plurality of output connectors for delivery of the communication based at least in part on previously collected event information associated with delivery of the communication.

The intelligent delivery system may be implemented in a customer communications management system, where the communications management system includes an input queue configured to store driver data that is used to generate communications for delivery to corresponding recipients, an orchestration server coupled to receive communications from the input queue, and a flow model executed by the orchestration server for processing of the communication, wherein the intelligent delivery server machine is coupled to the orchestration server and configured to perform an intelligent delivery task of the flow model.

In some embodiments, the communication may comprise a common communication directed to two different recipients, where the intelligent delivery server selects different ones of the output connectors for delivery of the common communication based on differences in recipient information associated with the different recipients. In some embodiments, the communication may be one of two or more communications directed to a single recipient, where the intelligent delivery server selects different ones of the plurality of output connectors for delivery of the two or more communications based on differences in context information associated with the two or more communications.

An alternative embodiment comprises a system for communication management and delivery. This system includes a communication generator component and a communication flow engine coupled to the communication generator component, where the communication flow engine executes a preexisting communication flow model and sends a request to the communication generator component to generate a runtime communication. The system also has a communication delivery tracker which is coupled to the communication generator component and an enterprise tool integrator that integrates a set of enterprise tools and receives enterprise events from the enterprise tools. The enterprise tool integrator forwards the enterprise events to the communication delivery tracker. The system also includes an external system output connector and an internal system output connector, each coupled to the communication generator component. The communication generator component generates the runtime communication based on a set of parameters received from a data platform coupled to the communication generator component and the enterprise events forwarded from the communication delivery tracker. The runtime communication comprises at least one of: an external system communication sent to an external system via the external system output connector; and an internal system communication sent to an internal system via the internal system output connector.

In some embodiments, the runtime communication is associated with and sent to a recipient, where the set of parameters received from the data platform comprise attributes associated with the recipient. In some embodiments, the enterprise events are related to the recipient, where the runtime communication sent to the recipient is further based on delivery events received from the communication delivery tracker, and the delivery events are associated with the recipient. The recipient may comprise a plurality of recipients, one of the recipients receiving the internal system communication and another one of the recipients receiving the external system communication.

In some embodiments, the runtime communication may be a plurality of runtime communications, and the system may include an event collector coupled to the external system output connector and to the internal system output connector, where the event collector receives delivery events corresponding to the plurality of runtime communications and stores the portion of the delivery events in an event database. The communication delivery tracker is coupled to the event database and receives at least a portion of the delivery events from the event database.

In some embodiments, the system further comprises a flow event component coupled to the communication flow engine, the flow event component configured to receive flow events related to the communication flow model and forward the flow events to the communication flow engine, where the communication flow engine processes the communication flow model based at least in part on the received flow events.

In some embodiments, the runtime communication is received by a recipient and the set of parameters of the data platform comprise: a set of attributes related to an audience of recipients including the recipient; and a set of attributes related to the recipient.

Alternative embodiments may include a method for intelligent delivery of communications, or a computer program product which embodies the functions of the intelligent delivery systems described above.

The various embodiments of the present invention may provide a number of advantages over existing systems. For example, embodiments disclosed herein simplify the process of designing a processing flow for communications and relieves users of the burden of building complex process flows that must include not only tasks for delivering communications to recipients, but also alternative tasks that perform error handling when the delivery tasks fail. The disclosed embodiments also enable dynamic selection of output channels for communications depending upon recipient information and context information so that different channels can be selected for different communications and recipients. Still further, embodiments disclosed herein enable the selection of output communication channels that are most likely to be effective in the delivery of communications to intended recipients, rather than requiring that all communications be processed in the same manner with the same output channels, as is the case with manually created static flows in existing systems.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
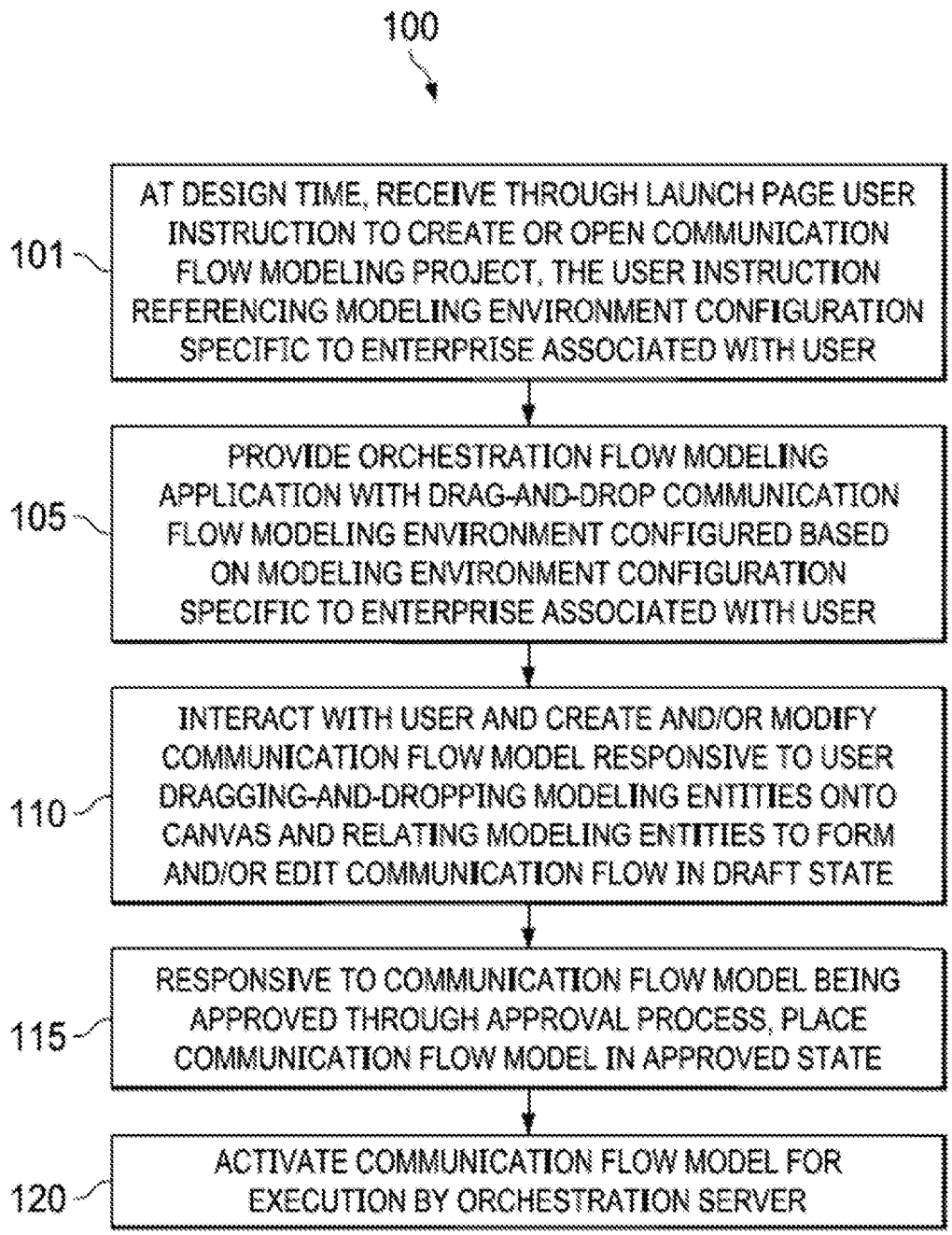
FIG. 1 is a flow chart illustrating an example of a method for communication flow modeling at design time according to some embodiments.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

As described above, a document architecture can support CCM on a single platform. The document architecture utilizes document fragments to construct documents of different versions. The versions can include different software (e.g., content server) platform-specific versions, user-based role versions, different contextual versions, etc. In one aspect, the entire set of document versions may represent a genus of the document and each version a species of the genus. The document architecture utilizes reusable document fragments to construct the different portions of the documents. The document architecture need not save each document, as a whole (e.g., a Word document, a Portable Document Format (PDF) file, a spreadsheet file, a presentation file, etc.), in storage. Instead, the document architecture can save a single instance of the document fragments (that make up a document) in storage. This has a technical effect of storing "documents" in a much more efficient manner than conventional document storage solutions. The document architecture can use a single instance of such a "document" to render versions of the document for output. The document architecture provides many advantages by representing a genus of documents using document fragments instead of the multitude of fully "assembled" document versions.

The document architecture can import a document, for instance, via an input connector, analyze the document to break it apart into pieces of data, apply rules to the pieces of data (e.g., metadata, headers, any designated parts, etc.) and persist them in an internal system format (referred to as "messages" or "normalized fragments") in a data storage device referred to herein as a message store. A CCM system implementing the document architecture disclosed has full control of messages stored in the message store.

The CCM system can further process the system-formatted messages to augment, extend, or otherwise refine them with additional information/instructions. The refined results (referred to as "formatted data" or "formatted fragments") can be checked for uniqueness and stored in another data storage device referred to as a document broker plus storage. As a result, only unique formatted fragments, and no duplicates, are stored in the document broker plus storage ready for use and reuse by downstream processes in the document architecture.

For example, fragments may be retrieved from the document broker plus storage for CCM post processing/formatting. This may involve assembling a document using the stored fragments based on instructions from a document definition associated with the document. After the document is assembled, the CCM system can invoke a driver/renderer to produce an output (e.g., a version of the document). A document may be rendered this way in different versions and in any desired format using the stored fragments. In this way, new communications may be generated from various combinations of fragments, in a new or different format than the original format of a document or documents from which fragments are used to generate the new communications.

The document architecture can be implemented as a microservices architecture having a plurality of services that work together to provide intelligent and efficient document production, management, storage, and rendering. Microservices is a variant of the service-oriented architecture (SOA). In a microservices architecture, services are fine-grained and the protocols are lightweight. Each service is self-contained and autonomous.

The CCM system and the underlying document architecture are technically complicated and complex. Such technical complexities necessitate the need for highly skilled programmers and/or software developers to make these services work together for a certain purpose (e.g., an email campaign). What is needed is a way to extend the functionality of the CCM system to non-programmers or non-technical users so that even users with no technical background or programming knowledge can control how a communication flows through the CCM system, including what actions (proactive and/or reactive actions) that the CCM system is to take (e.g., what service to call, whether another version of the communication is to be generated, which communications channel(s) the communication is to be delivered, etc.).

In some embodiments, the need to shield users from technical complexities usually required in modeling communication flows can be addressed by augmenting the document architecture with an UX application particularly configured for CCM communication flow modeling. The CCM communication flow modeling UX application can extend the functionality of the CCM system to non-technical users and yet shield them from the technical complexities and complicated execution logics of the CCM system and the underlying document architecture. For example, at design time, a user can use the CCM communication flow modeling UX application to model a communication flow. At runtime, a new orchestration server can run the communication flow on the document architecture and make sure that the communication flow works as modeled by the user at design time. The orchestration server can be part of the CCM system. The CCM system can reside at the backend of an enterprise (private) network or hosted in the cloud.

FIG. 1 is a flow chart illustrating an example of a method for communication flow modeling at design time according to some embodiments. In some embodiments, at design time, a system can receive, from a user device through a launch page, an instruction from a user to open or create a communication flow modeling project (step 101). Responsive to the instruction to open or create the communication flow modeling project, the CCM system may provide the user with a communication flow modeling environment through the orchestration flow modeling UX application that is particularly configured for drag-and-drop communication flow modeling (step 105). The orchestration flow modeling UX application provided by the CCM system is operable to interact with the user so that the user can model a communication flow like communication flow by dragging and dropping modeling entities (e.g., from a modeling entity menu) onto a canvas (step 110). In some embodiments, a communication flow reviewer can reject or approve the communication flow modeled by the user. If rejected, the communication flow is marked as in a rejected state and can be discarded or modified and resubmitted for review and approval. If approved, the communication flow is marked as in an approved state (115). Once the communication flow is the approved state, it is ready for activation and execution by an orchestration server (120).

Figure 2:
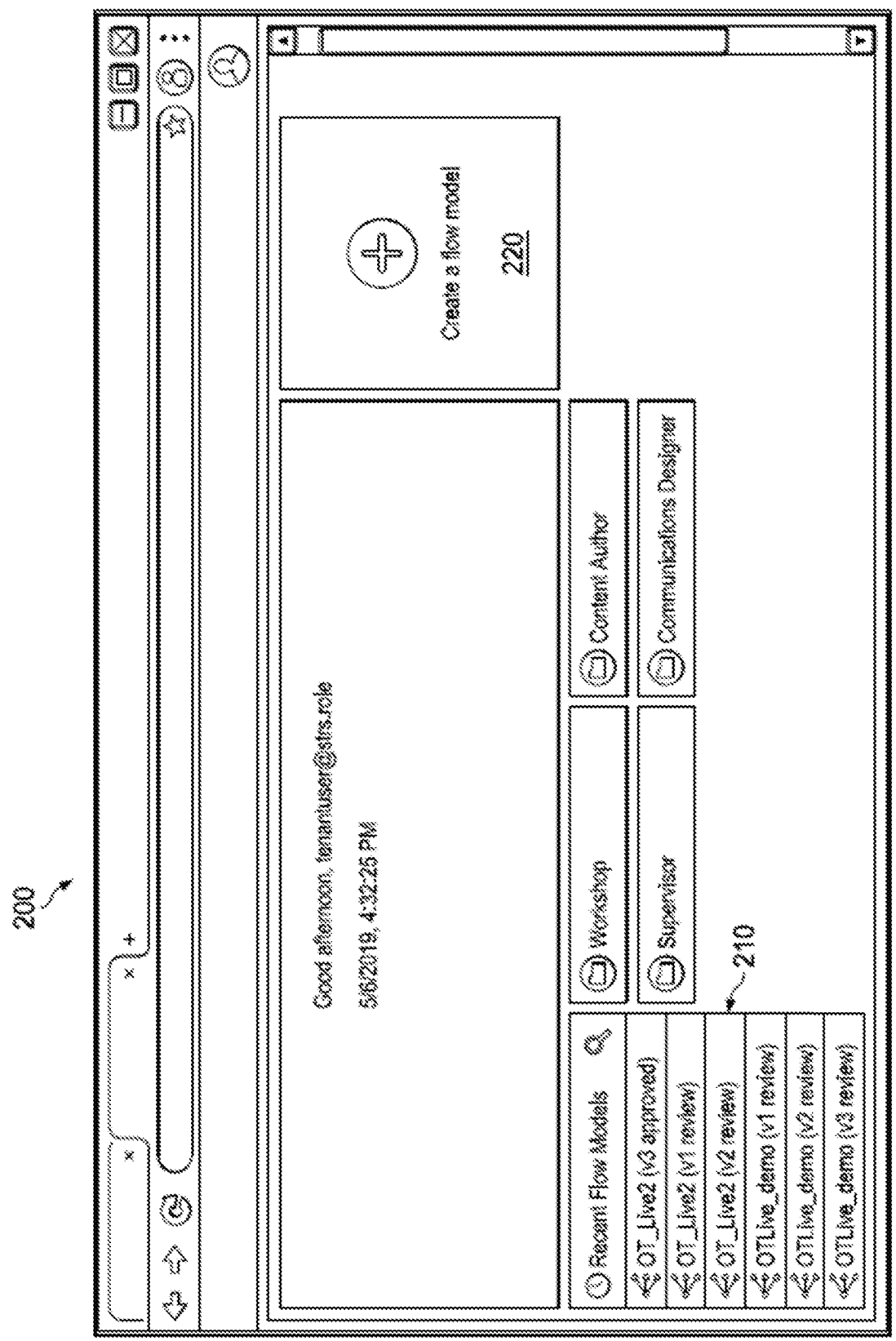
FIG. 2 depicts a diagrammatic representation of an example of a communication flow modeling launch page according to some embodiments.

An example of a launch page 200 is shown in FIG. 2. In this example, launch page 200 is a web based user interface of an orchestration flow modeling UX application. The orchestration flow modeling UX application can be hosted, on the server side, by a CCM system. In some embodiments, the user device can be communicatively connected to the system over a network. The instruction from the user can include a reference to a configuration for a drag-and-drop communication flow modeling environment. As discussed above, the configuration for the drag-and-drop communication flow modeling environment contains particular elements (e.g., orchestration server settings) for composing a communication flow model. The elements work with the orchestration flow modeling UX application to allow a user to create a communication flow model in a visual way that consumes those orchestration server settings. These elements are associated with a user group or persona. That is, the configuration for the drag-and-drop communication flow modeling environment is customized for the user based on, for instance, the user's association with an enterprise (which, for instance, can be a tenant of the system). In such cases, the configuration for the drag-and-drop communication flow modeling environment can be specific to the tenant such that modeling entities available through the drag-and-drop communication flow modeling environment are also specific to the tenant.

As shown in FIG. 2, the user may interact with launch page 200 (e.g., through menus 210, 220) to open an existing communication flow modeling project from file, create a new project from scratch, create a project using a project template, or open a project package for editing. The user interaction may trigger the launch of an orchestration flow modeling application. For example, as noted above, the CCM system may provide the user with a communication flow modeling environment through the orchestration flow modeling UX application responsive to the instruction from a user to open or create a communication flow modeling project, where the application is particularly configured for drag-and-drop communication flow modeling. To this end, launch page 200 shown in FIG. 2 represents a non-limiting example of how to launch an orchestration flow modeling application disclosed herein. Skilled artisans appreciate that the orchestration flow modeling application can be launched in many different ways (e.g., through a user's dashboard or a home page).

Figure 3:
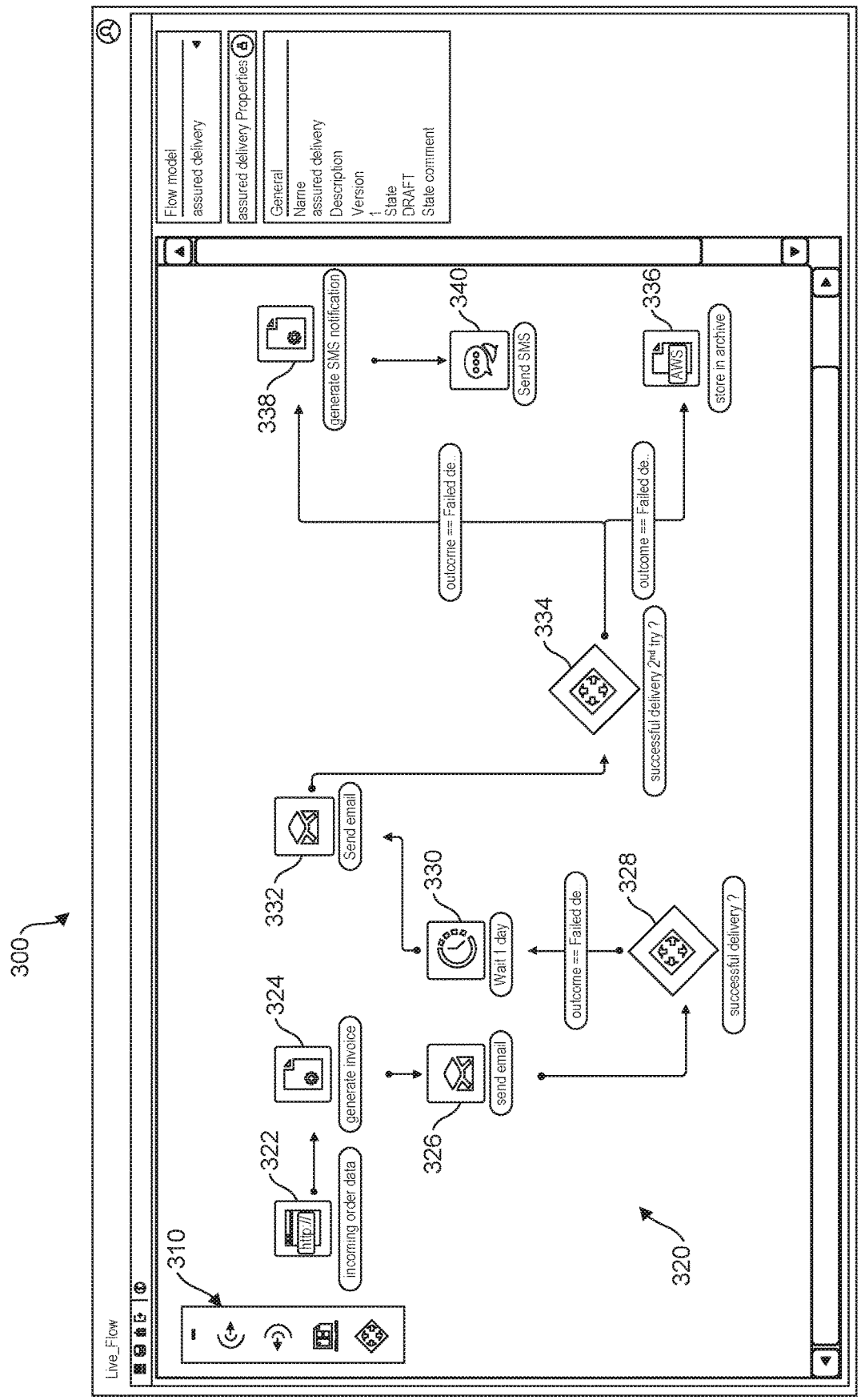
FIG. 3 illustrates an example of a manual communication flow modeling process using a user interface of a CCM communication flow modeling application.

Since the embodiments of the invention as described herein are designed to make it easier for users to design process flows for ensuring delivery of communications to customers of other recipients it may be helpful to first consider a conventional flow modeling process. Referring to FIG. 3, an example of an orchestration flow that is manually modeled by a user is shown.

As depicted in FIG. 3, a user can build a process flow model using a web based user interface (UI) 300 of an orchestration flow modeling UX application. In this example, UI 300 shows a communication flow 320 modeled using modeling entities from a modeling entity menu 310. This particular communication flow shows the processing of received order data to generate an invoice, which is then delivered to a recipient using a defined set of steps. It should be noted that the depicted communication flow is presented as a non-limiting example, and many other types of data, other types of communications, delivery channels, etc. can be included in other communication flows.

Communication flow 320 defines how input data (order data) from a data source is processed to generate a document (in this case an invoice), which is then sent to a recipient (the customer that is being invoiced). This example shows the potential complexities of the process definition that is required to deliver the document, particularly in light of the fact that attempts to deliver the document via some communication channels may fail, and the designer of the communication flow must account for these possibilities in order to be able to ensure that the document will be delivered.

As depicted in this figure, communication flow 320 begins with the receipt of incoming order data (322). The incoming order data is provided to a task 324 that generates an invoice from the order data. This task produces an invoice document which needs to be delivered to the customer associated with the invoice. The document is included in an email which is addressed to the customer identified in the order data, and the email is sent to the customer (326).

After the email has been sent to the customer, it is necessary to determine whether the email was successfully delivered, so a corresponding task 328 is included in the communication flow. If the email was successfully delivered, the communication flow can terminate at this point. There is a possibility, however, that the email is not successfully delivered. If this is the case, the communication flow executes a delay task 330. After the process is delayed for the designated interval (in this case, one day), a second attempt 332 at sending the email is performed. It is then determined at 334 whether the second attempted delivery of the email was successful. If the second attempted delivery of the email was successful, the communication flow can terminate.

If, however, the second attempted delivery was unsuccessful, some action must be taken to account for the fact that the invoice could not be delivered to the customer via email. In this example, communication flow 320 branches into two separate courses of action. In the first course of action, the invoice document is stored in an archive 336. The second course of action after the failed second attempt to deliver the email is to generate an SMS notification 338 that points to a self-service portal where the customer can view or download the invoice document. This notification is sent as an SMS to the customer via a corresponding communication channel 340. The customer can then access the invoice document stored in the archive via the self-service portal.

The example of FIG. 3 represents a relatively simple example in which delivery of an email is attempted twice, and then an SMS message is sent. A more typical example could be considerably more complicated, with attempts to deliver the document to several different email addresses, or over additional communication channels, with each attempted delivery including associated error handling tasks to account for the eventuality that the attempted delivery is unsuccessful. Even though the user interface of the orchestration flow modeling application provides a means for a non-technical user to construct the communication flow without requiring a substantial amount of technical knowledge regarding the implementation of the tasks, it is easy to see that the communication flow can nevertheless become very complex and confusing.

Furthermore, even though the modeling application simplifies the design of the communication flow, the communication flow is static and will be followed for every communication it processes, regardless of the fact that for different scenarios (e.g., different users, different communication types, etc.) different communication channels will be more effective. Thus, in some instances, the first communication channel used in the communication flow may be the most effective, while in other instances the first communication channel will not be the most effective. For the instances in which the first communication channel is not the most effective, the communication flow will nevertheless attempt to use these communication channels first, and more effective channels will not be used until they are reached later in the static communication flow.

Embodiments disclosed herein can improve the efficiency and effectiveness of delivering communications to recipients by enabling the replacement of statically designed tasks for communication flows with dynamic delivery tasks that select the most effective communication channels based on information associated with the communications being sent, the intended recipients of the communications, and other available contextual information. These intelligent delivery tasks may even select a different channel for the delivery of a message to a given recipient, depending upon context information such as the time of day. For example, recipients who are in a first age range may be more likely to use a first communication channel while recipients who are in a second age range may be more likely to use a different communication channel, or communications involving a business context may be more effectively communicated in an email while communications involving a personal context may be more effectively communicated in a DM on social media.

Figure 4:
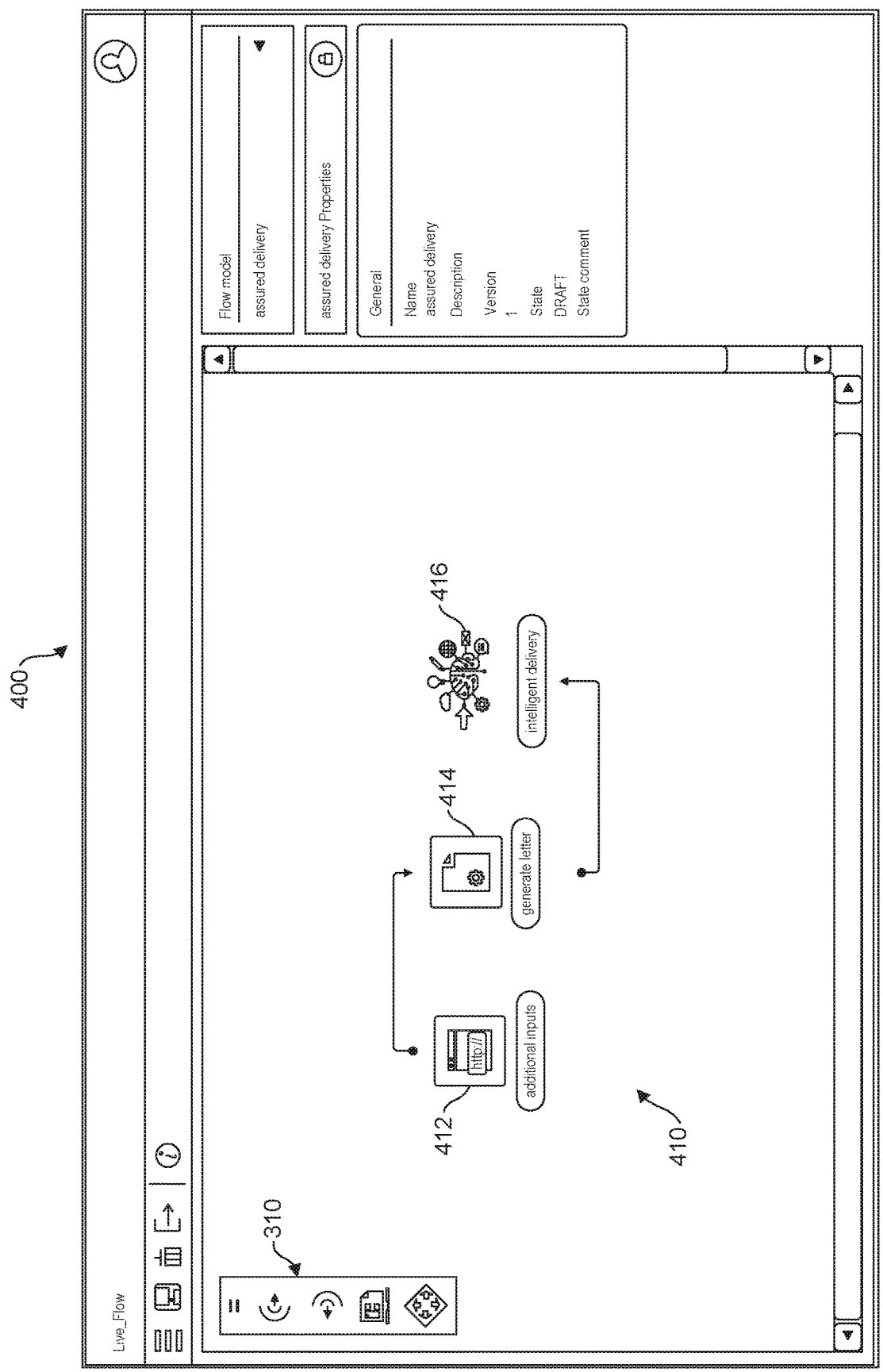
FIG. 4 illustrates an example of a communication flow modeling process using an intelligent delivery task in a user interface of a CCM communication flow modeling application.

Referring to FIG. 4, a web based user interface 400 of an orchestration flow modeling UX application similar to that of FIG. 3 is shown. In this example, however, interface 400 shows a communication flow 410 that is modeled using modeling entities that include an intelligent delivery task. This communication flow 410 in this example again concerns the processing of received order data to generate an invoice, but rather than having to manually design the flow of individual tasks (including a first attempt at emailing the document, delaying after an unsuccessful attempt, making a second attempt at email delivery, storing a user-accessible archived copy of the document, generating an SMS notification and sending the notification to the customer via an SMS channel), the user simply adds the intelligent delivery task to the communication flow.

As depicted in FIG. 4, communication flow 410 begins with the receipt of incoming order data 412. The incoming order data is provided to a task 414 that generates an invoice from the order data. The generated document is then provided to intelligent delivery task 416. The intelligent delivery task uses the context information associated with the generated document to identify which of the available output channels is most effective for communications having similar context information. The intelligent delivery task then delivers the generated document using the identified output channel.

It should be noted that the depicted communication flow is presented as a non-limiting example, and many other types of data, other types of communications, delivery channels, etc. can be included in other communication flows.

As will be discussed in more detail below, the intelligent delivery system used in the present embodiments tracks deliveries of communications with respect to the associated context information and then uses this information to determine the most effective ways to reach a recipient based on the available context. For example, if a customer is above 50 years old, they may be less familiar with social media, so the most effective way to reach this customer may be through an email or text message. Further, if the communication is sent during business hours, the customer may be more likely to see an email, while a communication after business hours may be more likely to be seen if it is sent in a text message. If the customer is 20 years old, they are probably more accustomed to using social media, so it may be more effective to reach this customer through an instant message (IM) on Facebook or Instagram, or through a message on Twitter. A conventional manually designed communication flow is static and does not account for these differences and simply sends the communication through the same channels, regardless of the individual customers' characteristics, time of day, or other contextual information.

FIG. 4 shows the impact of the disclosed embodiments on the user. The ability to build a communication flow that uses the intelligent delivery task will significantly reduce the burden on the user who builds the flow by eliminating the need for this user to consider how to best reach customers (e.g., which of the different delivery channels should be used and which tasks must be implemented to make use of those delivery channels) and how to react in the event of a failed attempt at delivery using a particular channel (e.g., retrying delivery, switching to a different output channel after some number of retries, etc.) The user can instead simply focus on the business case.

Additionally, the present embodiments can significantly improve the efficiency with which customers can be reached. As noted above, the manual design of a detailed communication flow results in a static arrangement of tasks that may be well suited to delivering communications in particular scenarios (e.g., a particular type of communication being sent to a particular recipient, assuming a particular set of circumstances), but may not be as effective in other scenarios. The intelligent delivery task makes use of a self-learning system that tracks delivery effectiveness in different contexts and, given a particular set of context information, selects the delivery channel that has been identified as the most effective output channel for delivery of comparable communications under comparable contextual conditions.

Figure 5:
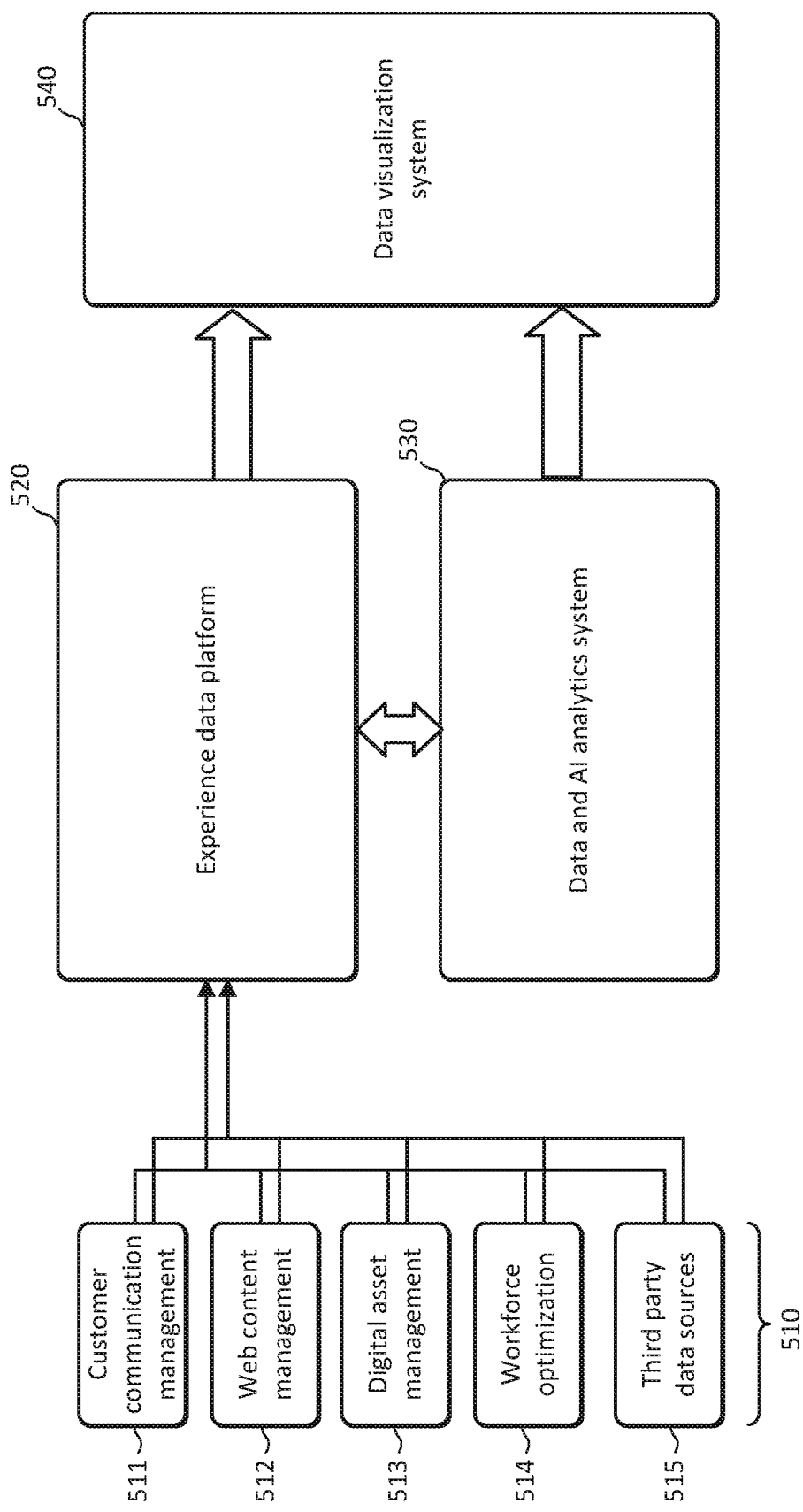
FIG. 5 is a diagram illustrating an example environment in which some embodiments of the intelligent delivery system can be implemented.

Referring to FIG. 5, a diagram is shown to illustrate an example environment in which some embodiments of the intelligent delivery system can be implemented. As depicted in this figure, a set of customer services 510 is coupled to an experience data platform 520. In this embodiment, customer services 510 include customer communications management system 511, web content management system 512, digital asset management system 513, workforce optimization system 514 and third party sources of information 515. The intelligent delivery system is implemented in customer communications management system 511.

Each of customer services 510 provides user experience information to experience data platform 520, which stores the information. Experience data platform 520 is coupled to a data and AI analytics system 530, which may perform text mining and analysis on the data stored in the experience data platform. The user experience information is provided to data visualization system 540, which provides user journey orchestration and analytics capabilities, as well as data visualization capabilities. The user experience information of is also available to be used by customer services 510. For example, the user experience data may be used by customer communications management system 511 to perform intelligent delivery services that are adapted to use this information to route communications to the output channels which are most effective for the specific customers and context of each communication.

Figure 6:
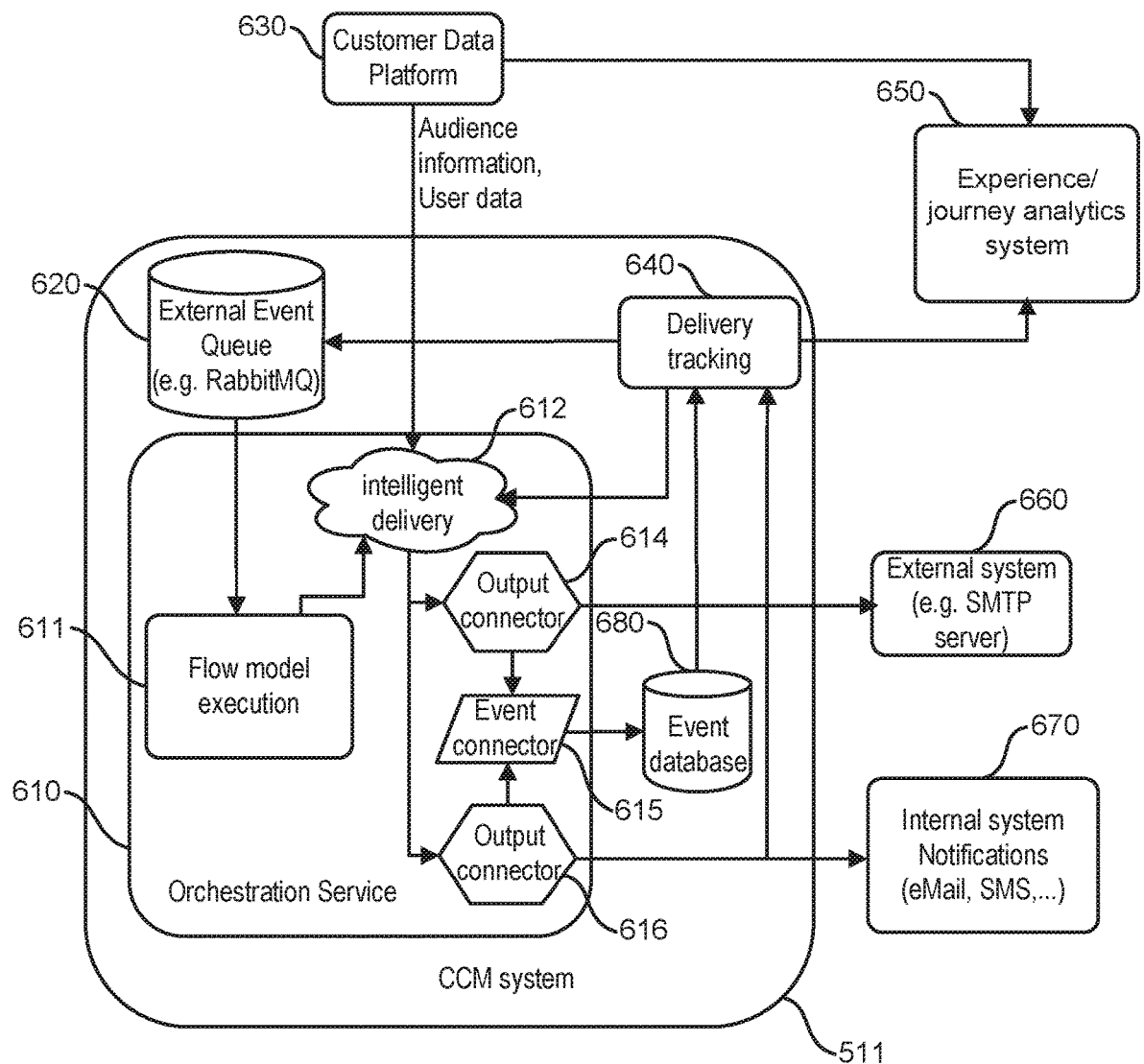
FIG. 6 is a diagram illustrating the structure of an intelligent delivery system in accordance with some embodiments.

Referring to FIG. 6, the structure of an intelligent delivery system in accordance with some embodiments is shown. As depicted in this figure, customer communications management system 511 includes an orchestration service 610 that is adapted to model a communication flow. Orchestration service 610 may use an orchestration flow modeling application and interface as described above.

Orchestration service 610 receives events from a queue 620 that stores the events until they are executed by the orchestration service. When orchestration service 610 receives the next event to be executed (e.g., via an input connector), it is provided to flow model execution engine 611. Flow model execution engine 611 uses a communication flow which may be designed by a user as discussed above (see, e.g., FIG. 4 and the corresponding description above). In the example of FIG. 4, input data is received and an invoice document is generated, then the invoice document is provided to an intelligent delivery task.

The intelligent delivery task of the communication flow is performed by intelligent delivery engine 612. The document (or other message) passed to the intelligent delivery task has information associated with it, such as the name of the customer to whom the document will be delivered, the type of communication being sent to the customer, and other context information. The specific information that is provided with the document/message may vary from one message to another and may vary between different embodiments. The intelligent delivery engine uses the information associated with the message to access stored information that has been tracked for comparable messages (i.e., messages for similar groups of recipients who are most likely using similar means to communicate, or messages that involve the same types of communications, e.g., communication of business documents). The retrieved information may even include tracking and delivery information for previous communications to the same customer. The information retrieved by the intelligent delivery engine indicates the effectiveness of using various different communication channels to send the comparable messages and provides the basis for the intelligent delivery engine to select one of the channels (the one determined most likely to be effective in communicating the message) for delivery of the message.

Intelligent delivery engine 612 retrieves customer related information from customer data platform 630 and retrieves tracking and delivery information from delivery tracking system 640. The customer information may include customer data that is collected in the data platform (e.g., customer attributes or other profile data or customer experience data that might be collected in experience data platform 520 of FIG. 5), as well as analytical data (e.g., user journey data that indicates the stage of the customer's relationship with the enterprise, e.g., whether this is a potential customer searching for a product, or an existing customer who has already purchased a product from the enterprise) that might be generated in other systems such as a user experience/journey analytics system 650. The delivery information that is obtained from delivery tracking system 640 may include information related to the delivery of the current message (e.g., whether a previous attempt to deliver the message via a particular communication channel failed, and a different channel should be used), as well as information related to the delivery of different, but comparable messages (e.g., what channels were most effective in delivery of messages of the same type or in delivery of messages to a similar group of recipients).

Using the information received with the document/message and the information retrieved from data sources such as customer data platform 630 and delivery tracking system 640, intelligent delivery engine 612 identifies one of the output communication channels that is determined to be most likely to be effective in delivering the document/message. The intelligent delivery engine then routes the document/message to the output connector for the selected communication channel. FIG. 6 shows two output connectors (614, 616). One of the connectors (614) is coupled to an external communication channel (660) which may be, for example, an SMTP server, while the other connector (616) is coupled to an internal communication channel (670) which may be, for example, an email or SMS communication channel. It should be noted that, although only two output communication channels and corresponding connectors are depicted in the figure, the system may be configured to use any number of available channels and corresponding connectors.

After intelligent delivery engine 612 forwards the document/message to the selected output connector, the output connector forwards the message to the corresponding communication channel. Event collector 615 monitors the output connectors and forwards delivery events to event database 680. The events may include both the attempt to deliver the message (i.e., forwarding the message to the communication channel) and the success or failure of the attempted delivery, as indicated to the output connector by status information which is returned by the respective communication channel.

The event data stored in event database 680 is provided to delivery tracking system 640 so that this system can track the status of the message's delivery. In some embodiments, delivery tracking system 640 may maintain the current delivery status of each attempted delivery while discarding outdated events (e.g., a status of attempted delivery without an indication of success or failure may be maintained until it is determined that the attempt either succeeded or failed, and then the attempted delivery status may be replaced with a succeeded/failed status.

As indicated above, the delivery tracking information that is maintained by delivery tracking system 640 is made available to intelligent delivery engine 612. Intelligent delivery engine 612 uses this tracking information for each message, along with the context information associated with the message to determine the likelihood of success of communicating via each of the available communication channels. In some embodiments, the intelligent delivery system uses a machine learning engine which is trained using the tracking event data to identify which of the communication channels are the most effective for particular types of context data. As additional messages are sent (or delivery of the messages is attempted), the corresponding event data is added to the event database and is used to update the training of the intelligent delivery system. In other words, the intelligent delivery system self-learns using the tracked delivery event data.

Thus, a communication which is entered into queue 620 Is provided to flow model execution engine 611. The communication flow model (e.g., as shown in FIG. 4) is executed and, when the intelligent delivery task is encountered, the communication and associated data are provided to intelligent delivery engine 612. Intelligent delivery engine 612 obtains data related to the recipient from customer data platform 630, and obtains related delivery information from delivery tracking system 640. Based on this data, intelligent delivery engine 612 determines the most effective output channel for the communication. Intelligent delivery engine 612 then routes the communication to the selected one of the output connectors (e.g., 614 or 616 In the embodiment of FIG. 6), which forwards the communication to the corresponding output channel. The output connector provides event information representing the attempted delivery of the communication to event collector 615, which stores the event data in event database 680. The output connector monitors the output channel to determine whether the attempted delivery of the communication has succeeded or failed and, when an indication of the success or failure is received, corresponding event data is provided to event collector 615, which in turn stores the event data in event database 680. The event data is provided from event database 680 to delivery tracking system 640, which makes the delivery status at the communication available to intelligent delivery engine 612. If the communication was successfully delivered, intelligent delivery engine 612 has completed the delivery task and can terminate operation with respect to this communication. If the communication has not been successfully delivered, the communication is returned to queue 620 so that intelligent delivery engine 612 can continue to process the communication. This processing may include, for example, retrying delivery using the same output channel, selecting a new output channel and attempting delivery via the newly selected channel, or determining that the message is undeliverable end performing error handling tasks search as providing a corresponding notification that the message was undeliverable.

Figure 7:
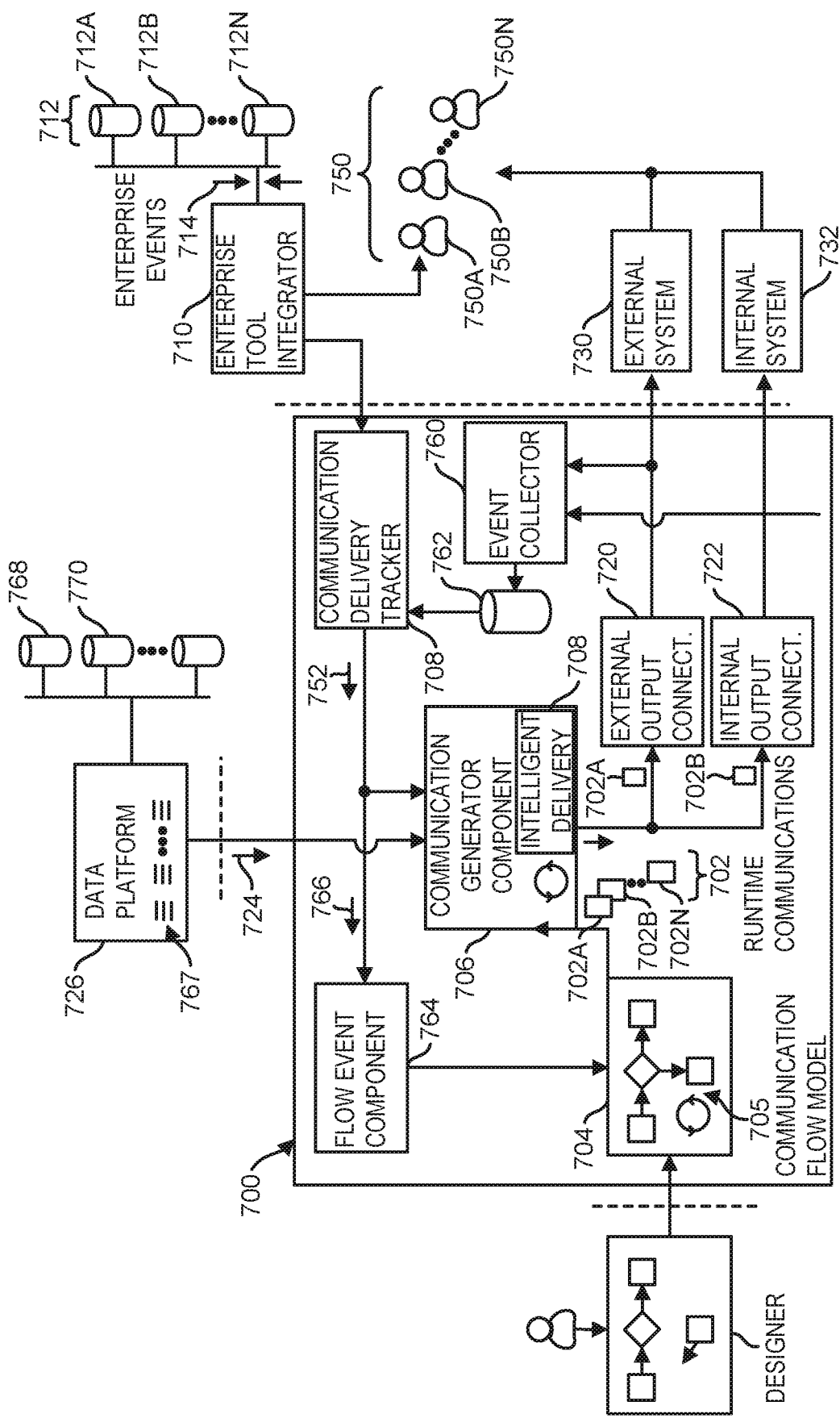
FIG. 7 is a diagram illustrating the structure of a system for communication management and delivery of a runtime communication in accordance with some embodiments.

In some embodiments, the inventive subject matter comprises a computing system, method, and/or programming product for communication management and delivery. Referring to FIG. 7, one such embodiment of the inventive subject matter is shown, comprising a system 700 for communication management and delivery of a runtime communication 702 initiated according to a communication flow engine 704 executing a preexisting communication flow model 705. The system 700 includes a communication generator component 706 coupled to the communication flow engine 704. The communication flow engine 704 executes the preexisting communication flow model 705 and sends a request to the communication generator component 706 to generate the runtime communication 702.

A communication delivery tracker 708 is coupled to the communication generator component 706 and to an enterprise tool integrator 710. The enterprise tool integrator 710 is a comprehensive component that integrates a set of enterprise tools 712A, 7128-712N. It receives enterprise events 714 from the enterprise tools (generally denoted by reference numeral 712) and forwards the enterprise events 714 to the communication delivery tracker 708.

Further, an external system output connector 720 is coupled to the communication generator component 706 and an internal system output connector 722 is also coupled to the communication generator component 706. The communication generator component 706 generates the runtime communication 702 based on a set of parameters 724 received from a data platform 726 coupled to the communication generator component 706. The communication generator component 706 also generates the runtime communication 702 based on the enterprise events 714 forwarded from the communication delivery tracker component 708. The runtime communication 702 comprises at least one of: an external system communication 702A sent to an external system 730 via the external system output connector 720 and, an internal system communication 702B sent to an internal system 732 via the internal system output connector 722. In a further embodiment, the external system 730 includes systems that are outside the control of the system 700, such as external social media platforms, chat channels, etc. The internal system 732 is within an enterprise network, or set of networks, controlled by an enterprise entity and/or related enterprise entities.

In another embodiment of system 700, the runtime communication 702 is associated with and sent to a recipient 750A, the set of parameters 724 received from the data platform 726 comprising attributes 767 associated with the recipient 750A. Further, the enterprise events 714 are related to the recipient 750A, and the runtime communication 702 is sent to the recipient 750A further based on delivery events 752 received from the communication delivery tracker 708, the delivery events 752 are associated with the recipient 750A. Still further, the system 700 may generate a plurality of runtime communications 702 and send them to a plurality of recipients 750, where one of the recipients (for example, recipient 750B) receives the internal system communication 702B and another one of the recipients (for example, recipient 750A) receives the external system communication 702A.

In still another embodiment of system 700, the runtime communication 702 is a plurality of runtime communications 702A, 702B, 702N and further comprises an event collector 760 coupled to the external system output connector 720 and to the internal system output connector 722, the event collector 760 receiving delivery events 752 corresponding to the plurality of runtime communications 702A, 702B, 702N and storing the delivery events 752 in an event database 762. Here, the communication delivery tracker 708 is coupled to the event database 762 and receives at least a portion of the delivery events 752 from the event database 762. System 700 may include a flow event component 764 coupled to the communication flow engine 704, the flow event component 764 receiving flow events 766 related to the communication flow model 705 and forwarding the flow events 766 to the communication flow engine 704. In turn, the communication flow engine 704 processes the communication flow model 705 based at least in part on the received flow events 766. It can be seen from the above that delivery events 752 are made up of enterprise event 714 and flow events 766, plus the events collected by event collector 760 and received from event database 762. Thus, communication delivery tracker 708 is responsible for collecting and sending the different event types to other components of system 700.

In yet another embodiment of system 700, the runtime communication 702 is received by a recipient (for example, recipient 750A) and the set of parameters 724 of the data platform 726 comprise, but are not limited to, a set of attributes related to an audience of recipients 768 including the recipient 750A and a set of attributes 770 related to the recipient 750A. Such attributes 768, 770 may be associated with recipient 750A (and, more generally, recipients 750) attributes collected from a variety of sources including, but not limited to, enterprise data and other internal enterprise information and content, and/or external data such as from social media platforms, web behavioral data, etc.

Figure 8:
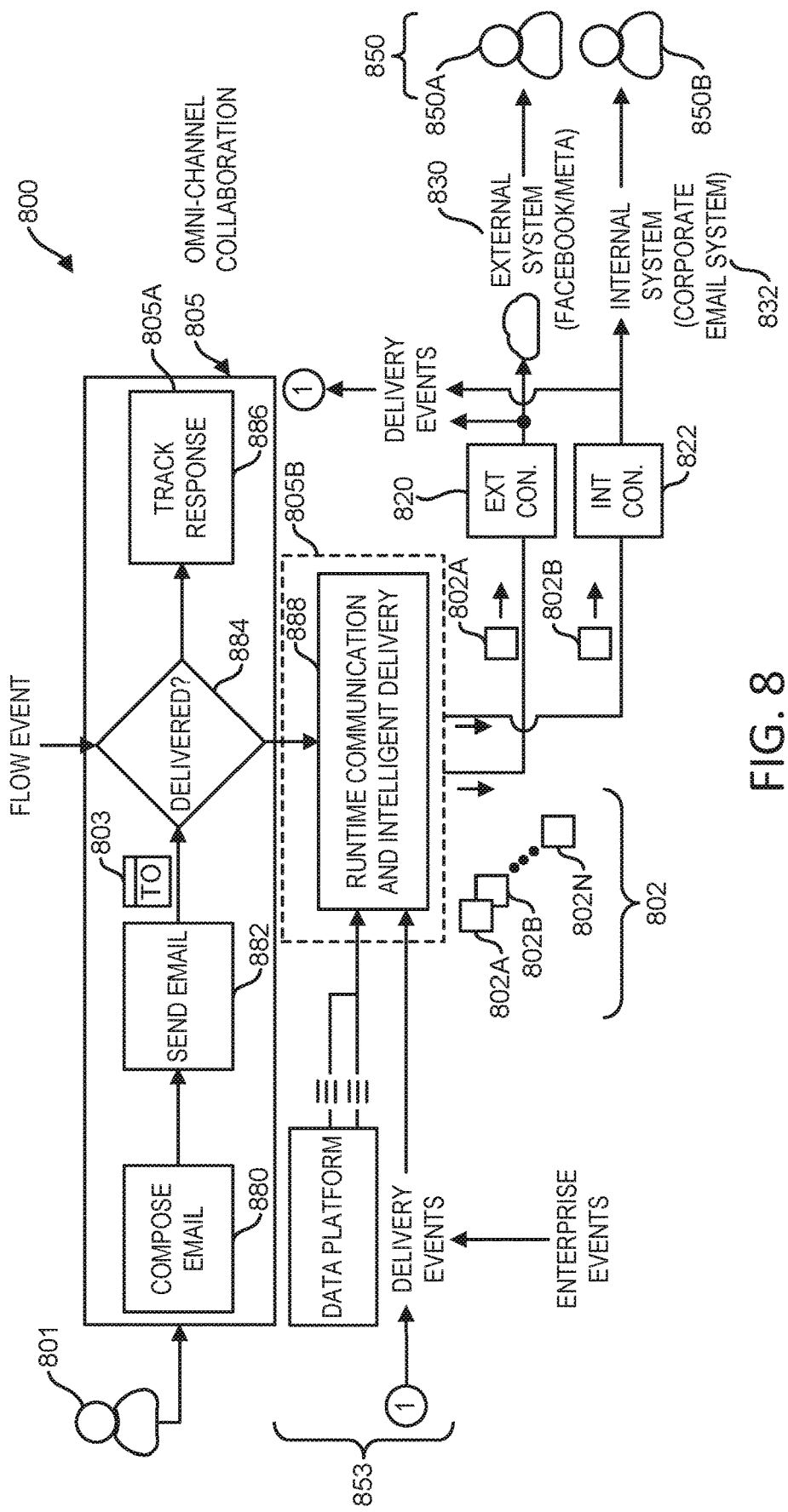
FIG. 8 is a diagram illustrating the operation of a system for communication management and delivery of a runtime communication in accordance with some embodiments.

Referring now to FIG. 8 and again to FIG. 7, in a non-limiting example 800 of the inventive subject matter in operation, a communication flow designer 801 designs a communication flow model 805 which the communication flow engine 704 executes. The communication flow model 805 comprises a preexisting flow portion 805A portion and a dynamic flow portion 805B. The dynamic flow portion 805B includes a runtime communication 802 that the communication generator component 706 generates during execution of the communication flow model 805 using an intelligent delivery component 709. The communication generator component 706 generates the runtime communication 802 based on received data and events 853. Such data and events 853 are dynamic and particular to (but necessarily limited to) recipients and audiences who are the subject of the received communications, at least a portion of which originate from the preexisting flow model 805A and the runtime communication 802 of the dynamic flow portion 805B which uses the intelligent delivery component to dynamically select the best channel for delivery of the communication. In this way, the system 800, in this non-limiting example, provides a high degree of design control and flexibility over communication management and delivery. Here, the communication flow designer 801 can control a predetermined flow portion of communications and events (as in 805A), yet add-in flexibility in the dynamic flow portion 805B that feeds in and responds to data related to a recipient and context of the communications, so that the system dynamically responds to attributes and events 853 as they evolve, update, unfold in real-time.

In this example, to initiate operation 800, the communication flow engine 704 loads and executes the communication flow model 805. At 880, the communication flow engine 704 composes a communication such as an email 803 and at 882 sends the email 803 a recipient (such as recipient 850). Such an email 803 can be part of an omni-channel collaboration that includes multiple systems and applications 712, 730, 732 and recipients 750, 850. The communication flow model 805 determines whether the email 803 was properly delivered at 884. If so, then at 886 the response to the email 803 is tracked. If the email 803 was not properly delivered, as determined at 884, the communication flow model 805 at 888, in the dynamic flow portion 805B, generates a runtime communication 802. Here, the communication flow engine 704 sends a request to the communication generator component 706 to generate the runtime communication 802. In this way, the communication flow model can respond more effectively by essentially generating in real-time a runtime communication 802 based on dynamic, evolving, and highly responsive attributes and events 853.

It should be noted that although this example begins with a static flow portion in which generation and delivery of an email is attempted prior to dynamically generating an alternative communication and attempting to deliver this communication via a channel dynamically selected by an intelligent delivery component of the system, other examples need not include a static portion of the communication flow and may involve only dynamic generation and delivery of communications using the intelligent delivery component.

The communication generator component 706 requests and receives input 853 from the data platform 726 and the communication delivery tracker 708. Here, the communication generator component 706 may generate a query to the data platform 726 to receive a set of parameters 724. In a non-limiting manner, the query may include attributes of the recipient (such as recipient 850A) such as a recipient unique identification tag, an age, a gender, a location, a market segment, audience information that includes recipient 850A as a member, etc. The communication generator component 706 may also generate a query to the delivery tracker 708 for delivery events 752 and/or enterprise events 714. Based on the received input 853, communication generator component 706 generates the runtime communication, as will be explained herein below. It should be noted that the communication generator component 706 may automatically receive input 853 from data platform 726 and deliver tracker 708, without the need to query the components. Here, the communication generator component 706 may receive information updates and parse through the updates to compose the runtime communication 802.

A variety of techniques may be used to further generate the runtime communication 802. In a non-limiting example, communication generator component 706 may use artificial intelligence and/or machine learning methodologies to compose the runtime communication 802. It may use a communication model that includes a recipient unique identification tag, communication content such as text and/or imagery, and a communication mode, such as email, text, video, audio, etc. The communication generator component 706 may use the received events 752 to determine which communication modes were most successful in delivering a communication in previous scenarios. It may use exemplars to automatically build a communication model and augment the model instances with new recipient information and/or event information.

Further to this example, one runtime communication 802A may be generated for a recipient 850A that sends the runtime communication 802A to an external system 830 via an external system connector 820. Here, runtime communication 802A is sent to the recipient's 850A Facebook/Meta feed based on the attribute and event information (that may include 853) that recipient 850A is most likely, based on past behavior, to respond to Facebook/Meta messages than messages in other modes, such as email. In contrast, another runtime communication 802B may be generated for a recipient 850B that sends the runtime communication 802B to an internal system 832 via an internal system connector 822. Here, runtime communication 802B is sent to the recipient's 850B enterprise email application based on the attribute and event information (again, that may include 853) that recipient 850B is most likely, based on past behavior, to respond to email messages than messages in other modes, such as text services. One of ordinary skill in the art will readily appreciate the ability to design a communication flow that includes a high degree of flexibility (as in step 888 in dynamic flow portion 805B) based on attribute information, prior behavior, and event monitoring (such as 853), while also preserving the ability to design preexisting portions (as in preexisting steps 880, 882, 884, 886 for preexisting flow portion 805A).

Figure 9:
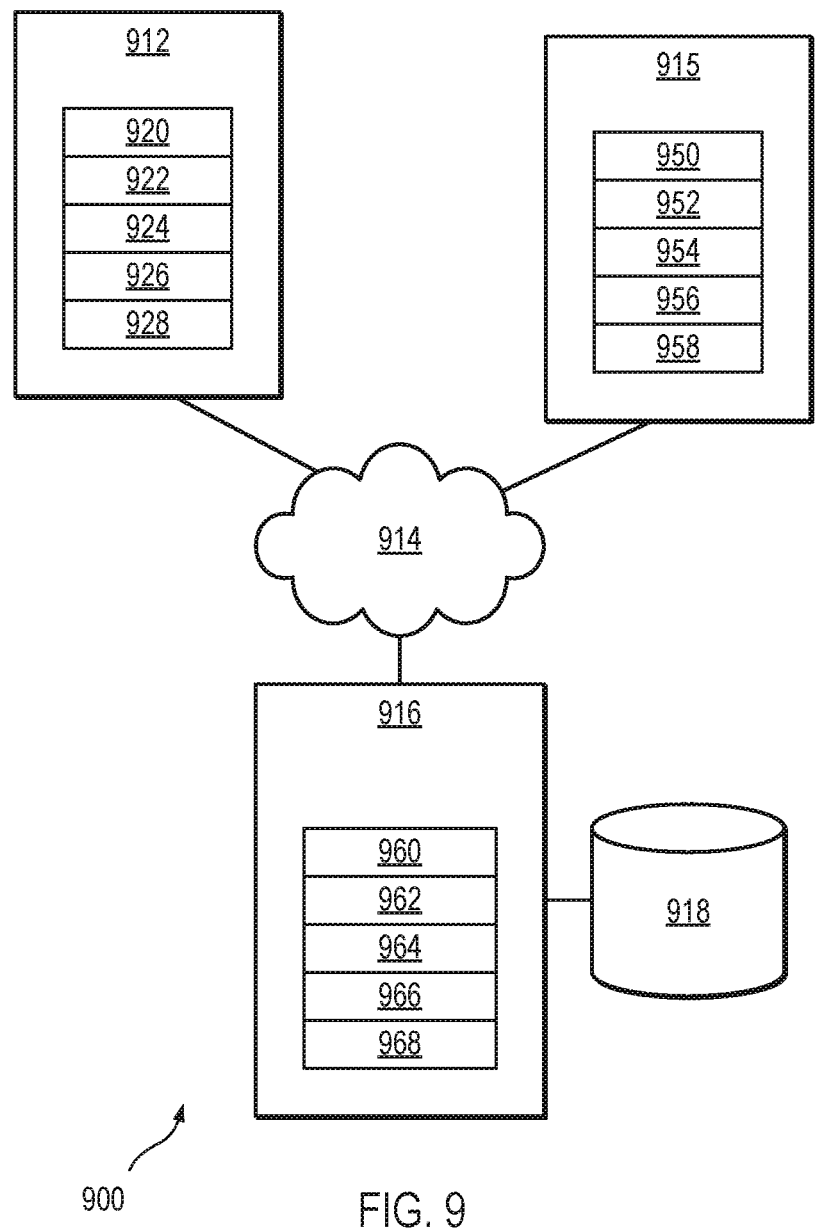
FIG. 9 depicts a diagrammatic representation of a distributed network computing environment where embodiments disclosed can be implemented.

FIG. 9 depicts a diagrammatic representation of a distributed network computing environment where embodiments disclosed can be implemented. In the example illustrated, network computing environment 900 includes network 914 that can be bi-directionally coupled to designer computer 912, user computer 915 and server computer 916. Network 914 may represent a combination of wired and wireless networks that network computing environment 900 may utilize for various types of network communications known to those skilled in the art.

For the purpose of illustration, a single system is shown for each of computers 912, 915 and 916. However, with each of these computers, a plurality of computers (not shown) may be interconnected to each other over network 914. For example, a plurality of computers 912 (or 915 or 916) may be coupled to network 914. Computers 912 may include data processing systems for CCM communication builders (or programmers). User computer 915 may include data processing systems for CCM process decision makers (or non-programmers). Server computer 916 may include data store 918 for storing applications or related data.

Computer 912 can include central processing unit ("CPU") 920, read-only memory ("ROM") 922, random access memory ("RAM") 924, hard drive ("HD") or storage memory 926, and input/output device(s) ("I/O") 928. I/O 928 can include a keyboard, monitor, printer, electronic pointing device (e.g., mouse, trackball, stylus, etc.), or the like. Computer 912 can include a desktop computer, a laptop computer, a personal digital assistant, a cellular phone, or nearly any device capable of communicating over a network. Computer 915 may be similar to computer 912 and can comprise CPU 950, ROM 952, RAM 954, HD 956, and I/O 958. Many other alternative configurations are possible and known to skilled artisans.

Each of the computers in FIG. 9 may have more than one CPU, ROM, RAM, HD, I/O, or other hardware components. For the sake of brevity, each computer is illustrated as having one of each of the hardware components, even if more than one is used. Each of computers 912, 915 and 916 is an example of a data processing system. ROM 922, 952 and 962; RAM 924, 954 and 964; and HD 926, 956 and 966; can include media that can be read by CPU 920, 950 or 960; and can provide output or receive input via I/O 928, 958, or 968. Therefore, these types of memories include non-transitory computer-readable storage media. These memories may be internal or external to computers 912, 915 or 916.

Portions of the methods described herein may be implemented in suitable software code that may reside within ROM 922, 952 or 962; RAM 924, 954 or 964; or HD 926, 956 or 966. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be implemented using any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc.

Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A system for communication management and delivery, the system comprising:
   a communication generator component;
   a communication flow engine coupled to the communication generator component, the communication flow engine sending a request to the communication generator component to generate a runtime communication;
   a communication delivery tracker coupled to the communication generator component, wherein the communication delivery tracker receives enterprise events from a set of enterprise tools and forwards the enterprise events to the communication generator component;
   the communication generator component generating the runtime communication based on at least the enterprise events forwarded from the communication delivery tracker, the runtime communication comprising at least one of:
      an external system communication sent to an external system via an external system output connector; and
      an internal system communication sent to an internal system via an internal system output connector.

2. The system of claim 1, wherein the communication generator component is coupled to a data platform to receive a set of parameters, and wherein the runtime communication is associated with and sent to a recipient, the set of parameters received from the data platform comprising attributes associated with the recipient.

3. The system of claim 2, wherein the runtime communication is received by a recipient and wherein the set of parameters of the data platform comprise:
   a set of attributes related to an audience of recipients including the recipient; and
   a set of attributes related to the recipient.

4. The system of claim 2, wherein the enterprise events are related to the recipient, the runtime communication sent to the recipient further based on delivery events received from the communication delivery tracker, the delivery events associated with the recipient.

5. The system of claim 4, wherein the recipient comprises a plurality of recipients, one of the recipients receiving the internal system communication and another one of the recipients receiving the external system communication.

6. The system of claim 1, wherein the runtime communication is a plurality of runtime communications, the system further comprising:
   an event collector coupled to the external system output connector and to the internal system output connector, the event collector receiving delivery events corresponding to the plurality of runtime communications and storing the at least a portion of the delivery events in an event database, the communication delivery tracker coupled to the event database and receiving at least a portion of the delivery events from the event database.

7. The system of claim 1, further comprising:
   a flow event component coupled to the communication flow engine, wherein the communication flow engine executes a preexisting communication flow model, and wherein the flow event component receives flow events related to the communication flow model and forwards the flow events to the communication flow engine, the communication flow engine processing the communication flow model based at least in part on the received flow events.

8. A method for communication management and delivery, the method comprising:
   at a communication flow engine coupled to a communication generator component,
   sending a request to the communication generator component to generate a runtime communication;
   forwarding enterprise events to a communication delivery tracker coupled to the communication generator component, wherein the communication delivery tracker receives a set of enterprise events;
   generating, at the communication generator component, the runtime communication based on at least the enterprise events forwarded from the communication delivery tracker; and
   sending, at the communication generating component, the runtime communication comprising at least one of:
      an external system communication to an external system via an external system output connector coupled to the communication generator component; and
      an internal system communication to an internal system via an internal system output connector coupled to the communication generator component.

9. The method of claim 8, further comprising:
   receiving, at the communication generator component, a set of parameters from a data platform coupled to the communication generator component, wherein the runtime communication is associated with a recipient, and the set of parameters received from the data platform comprises attributes associated with the recipient.

10. The method of claim 9, further comprising:
    receiving, by a recipient, the runtime communication, wherein the set of parameters of the data platform comprise a set of attributes related to an audience of recipients including the recipient and a set of attributes related to the recipient.

11. The method of claim 9, wherein the enterprise events are related to the recipient, the method further comprising:
receiving delivery events from the communication delivery tracker, the delivery events associated with the recipient; and
sending, at the communication generator component, the runtime communication to the recipient further based on the delivery events.

12. The method of claim 11, wherein the recipient is a plurality of recipients, the method further comprising:
receiving, by one of the recipients, the internal system communication; and
receiving, by another one of the recipients, the external system communication.

13. The method of claim 8, wherein the runtime communication is a plurality of runtime communications, the method further comprising:
receiving, at an event collector coupled to the external system output connector and to the internal system output connector, delivery events corresponding to at least a portion of the plurality of runtime communications;
receiving, at the communication delivery tracker coupled to the event database, at least a portion of the delivery events; and
storing the at least a portion of the delivery events at an event database.

14. The method of claim 8, further comprising;
receiving, at a flow event component coupled to the communication flow engine, flow events related to a preexisting communication flow model;
forwarding the flow events to the communication flow engine; and
processing, at the communication flow engine, the communication flow model based at least in part on the received flow events.

15. A computer program product for communication management and delivery, the computer program product comprising:
a storage medium comprising computer instructions that, when loaded into a memory of a processor, causes the processor to perform:
at a communication flow engine coupled to a communication generator component, sending a request to the communication generator component to generate a runtime communication;
forwarding enterprise events to a communication delivery tracker coupled to the communication generator component, wherein the communication delivery tracker receives a set of enterprise events;
generating, at the communication generator component, the runtime communication based on at least the enterprise events forwarded from the communication delivery tracker; and
sending, at the communication generating component, the runtime communication comprising at least one of:
an external system communication to an external system via an external system output connector coupled to the communication generator component; and
an internal system communication to an internal system via an internal system output connector coupled to the communication generator component.

16. The computer program product of claim 15, the processor further performing receiving, at the communication generator component, a set of parameters from a data platform coupled to the communication generator component, wherein the runtime communication is associated with a recipient and wherein the set of parameters received from the data platform comprises attributes associated with the recipient.

17. The computer program product of claim 16, wherein the enterprise events are related to the recipient, the processor further performing:
receiving delivery events from the communication delivery tracker, the delivery events associated with the recipient; and
sending, at the communication generator component, the runtime communication to the recipient further based on the delivery events.

18. The computer program product of claim 17, wherein the recipient comprises a plurality of recipients, the processor further performing:
receiving, by one of the recipients, the internal system communication; and
receiving, by another one of the recipients, the external system communication.

19. The computer program product of claim 15, wherein the runtime communication comprises a plurality of runtime communications, the processor further performing:
receiving, at an event collector coupled to the external system output connector and to the internal system output connector, delivery events corresponding to at least a portion of the plurality of runtime communications;
receiving, at the communication delivery tracker coupled to the event database, the at least a portion of the delivery events; and
storing the at least a portion of the delivery events in an event database.

20. The computer programming product of claim 15, the processor further performing;
receiving, at a flow event component coupled to the communication flow engine, flow events related to a preexisting communication flow model;
forwarding the flow events to the communication flow engine; and
processing, at the communication flow engine, the communication flow model based at least in part on the received flow events.

* * * * *